(12) United States Patent
Yamada et al.

(10) Patent No.: US 7,098,273 B2
(45) Date of Patent: Aug. 29, 2006

(54) RESIN COMPOSITION

(75) Inventors: Toshiaki Yamada, Tsukuba (JP);
Hajime Ban, Tsukuba (JP); Hiroyuki Kudo, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 117 days.

(21) Appl. No.: 10/871,063

(22) Filed: Jun. 21, 2004

(65) Prior Publication Data

US 2004/0266956 A1 Dec. 30, 2004

(30) Foreign Application Priority Data

Jun. 26, 2003 (JP) .............................. 2003-182149

(51) Int. Cl.
*C08L 77/00* (2006.01)
*C08L 79/08* (2006.01)

(52) U.S. Cl. ..................... 525/420; 525/423; 525/425; 525/433; 528/310; 528/322

(58) Field of Classification Search .............. 525/420, 525/423, 425, 433; 528/310, 322
See application file for complete search history.

(56) References Cited

U.S. PATENT DOCUMENTS

| | | | |
|---|---|---|---|
| 3,378,522 A * | 4/1968 | Martin | 525/534 |
| 5,387,652 A * | 2/1995 | Kawaki et al. | 525/419 |
| 6,130,307 A * | 10/2000 | Amagai et al. | 528/73 |
| 6,545,075 B1 | 4/2003 | Nishihata et al. | |

FOREIGN PATENT DOCUMENTS

| | | |
|---|---|---|
| EP | 0 241 019 A2 | 4/1987 |
| JP | 44-19274 | 8/1969 |
| JP | 46-15513 | 4/1971 |
| JP | 49-4077 | 1/1974 |
| JP | 63-33775 | 7/1988 |
| JP | 07150027 | 6/1995 |
| JP | 07157648 | 6/1995 |
| JP | 07242805 | 9/1995 |
| JP | 2868043 | 12/1998 |
| JP | 11-293109 | 10/1999 |

\* cited by examiner

*Primary Examiner*—P. Hampton Hightower
(74) *Attorney, Agent, or Firm*—Wenderoth, Lind, & Ponack, L.L.P.

(57) ABSTRACT

An object of the present invention is to improve the compatibility of the resin composition comprising the PAI resin and the PAS resin so as to provide a resin composition which is excellent in flowability when molten, strength, tenacity and heat resistance.

A resin composition comprising:
(1) 5 to 60 parts by weight of aromatic polyamide imide resin (A) having a weight average molecular weight (Mw) of 1,000 to 100,000 and having an amino group in an amount of 0.00002 to 0.002 mol/g in a molecule,
(2) 95 to 40 parts by weight of polyarylene sulfide resin (B), and
(3) 0.01 to 10 parts by weight of episulfide compound (C) based on 100 parts by weight of the total of (A) and (B).

12 Claims, No Drawings

RESIN COMPOSITION

TECHNICAL FIELD

The present invention relates to a novel resin composition which is excellent in extrusion moldability and injection moldability as well as heat resistance, flowability when molten and strength, tenacity and sliding properties.

BACKGROUND ART

Aromatic polyamide imide resins (hereinafter may be abbreviated as "PAI resins") are plastic materials which are excellent in heat resistance, mechanical strength, electric properties and chemical resistance and have self-lubricating ability. However, melt flowability thereof is unsatisfactory except for such applications as varnish and films, and most of them are often difficult to injection-mold. Thus, they are currently molded by a compression molding method.

Meanwhile, polyarylene sulfide resins (hereinafter may be abbreviated as "PAS resins") typified by polyphenylene sulfide resins (hereinafter may be abbreviated as "PPS") are excellent in heat resistance, electric properties and solvent resistance and particularly excellent in melt flowability. Further, it is known that they are provided with excellent mechanical strength, rigidity and dimensional stability when reinforced by use of a filler, et al.

DESCRIPTION OF THE RELATED ART

It is proposed that a resin composition having excellent heat resistance, mechanical strength and flowability is obtained by integrating the PAI resin and the PAS resin (refer to Patent Publication 1 and Patent Publication 2).

However, even in the above resin composition, the PAI resin is not made compatible to a satisfactory extent, and a material having good melt flowability, tenacity and mechanical strength is not yet obtained after the integration. Thus, the resin composition is not suitable for such applications as precision molding and molding of thin articles.
(Patent Publication 1)
Japanese Patent No. 2,868,043
(Patent Publication 2)
JP-A 11-293109 (the term "JP-A" as used herein means an "unexamined published Japanese patent application")

DISCLOSURE OF THE INVENTION

In view of the above problem, an object of the present invention is to improve the compatibility of the resin composition comprising the PAI resin and the PAS resin so as to facilitate integration of the resins by melt kneading. Another object of the present invention is to provide a resin composition which is excellent in flowability when molten, strength, tenacity and heat resistance.

That is, the present invention includes a resin composition comprising:
(1) 5 to 60 parts by weight of aromatic polyamide imide resin (A) having a weight average molecular weight (Mw) of 1,000 to 100,000 and having an amino group in an amount of 0.00002 to 0.002 mol/g in a molecule,
(2) 95 to 40 parts by weight of polyarylene sulfide resin (B), and
(3) 0.01 to 10 parts by weight of episulfide compound (C) based on 100 parts by weight of the total of (A) and (B).

The present invention also includes a molded article comprising the resin composition.

The present invention also includes a method for improving the melt flowability of a resin composition comprising an aromatic polyamide imide resin and a polyarylene sulfide resin, the method comprising adding 0.01 to 10 parts by weight of episulfide compound (C) to a resin composition comprising 5 to 60 parts by weight of aromatic polyamide imide resin (A) having a weight average molecular weight (Mw) of 1,000 to 100,000 and having an amino group in an amount of 0.0002 to 0.005 mol/g in a molecule and 95 to 40 parts by weight of polyarylene sulfide resin (B).

BEST MODE FOR CARRYING OUT THE INVENTION

<Aromatic Polyamide Imide Resin (A)>

The aromatic polyamide imide resin (PAI resin) which is the component (A) of the resin composition of the present invention is represented by the following general formula (I):

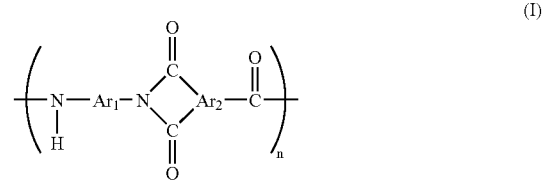

($Ar_1$ represents a divalent aromatic group having 6 to 18 carbon atoms, a divalent alicyclic group having 6 to 18 carbon atoms or a divalent aliphatic group having 2 to 12 carbon atoms; $Ar_2$ represents a trivalent aromatic group having 6 to 18 carbon atoms; and n represents an integer of 4 to 400.)

An example of the divalent aromatic group having 6 to 18 carbon atoms represented by $Ar_1$ is a substituted or unsubstituted arylene group. Illustrative examples of the arylene group include a phenylene group, a naphthalene group, a biphenylene group and a benzylene group (toluene-diyl), 1,4-phenylenebis(methylene) group. Illustrative examples of the substituent include alkyl groups having 1 to 3 carbon atoms such as a methyl group, an ethyl group and a propyl group and halogen atoms such as a chlorine atom and a bromine atom.

Further, as $Ar_1$, an aromatic group represented by the following formula:

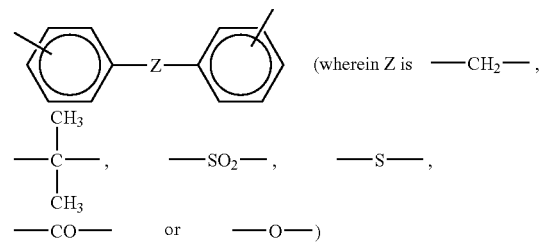

is also presented.

More specifically, aromatic groups represented by the following formulae are presented.

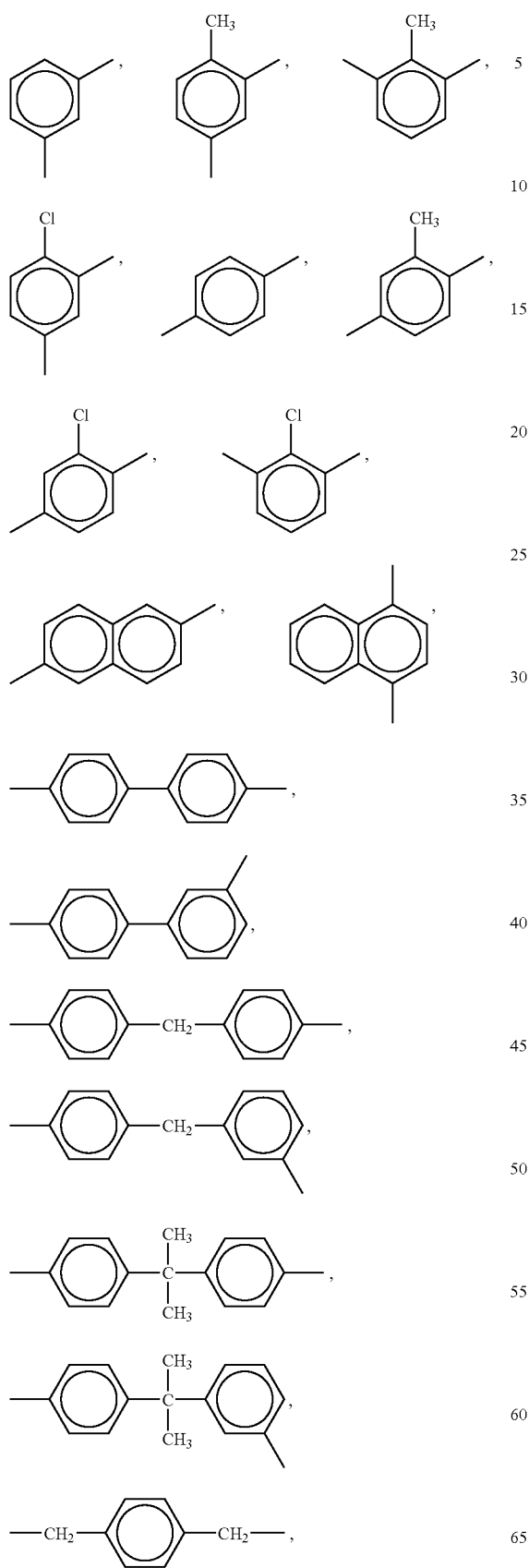

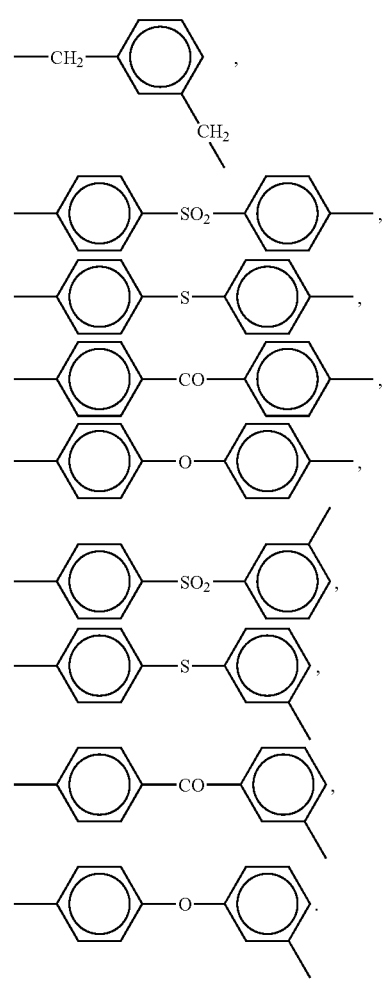

An example of the divalent alicyclic group having 6 to 18 carbon atoms represented by $Ar_1$ is a substituted or unsubstituted cycloalkylene group. More specifically, the following cycloalkylene groups are presented.

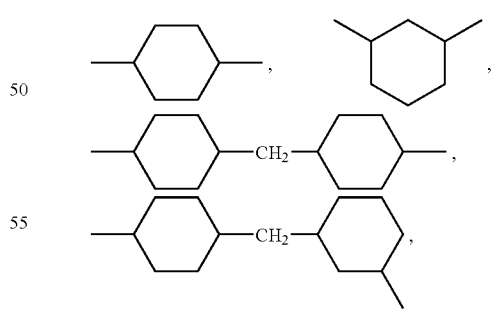

An example of the divalent aliphatic group having 2 to 12 carbon atoms represented by $Ar_1$ is an alkylene group having 2 to 12 carbon atoms. More specifically, a group represented by $-(CH_2)_m-$ (m=2 to 12) is presented.

Although the above groups are presented as specific examples of $Ar_1$, it is also possible to use two or more compounds in admixture.

Particularly preferred examples thereof include the following.

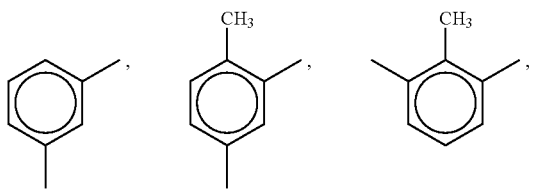

Ar$_2$ is a trivalent aromatic group having 6 to 18 carbon atoms. Illustrative examples of the aromatic group include a substituted or unsubstituted phenyl-triyl group and an aromatic group (Y is —CO— or —O—CO—) represented by the following formula.

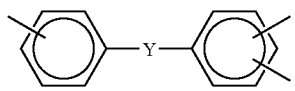

More specifically, the following are presented as examples thereof. However, it is also possible to use two or more compounds in admixture.

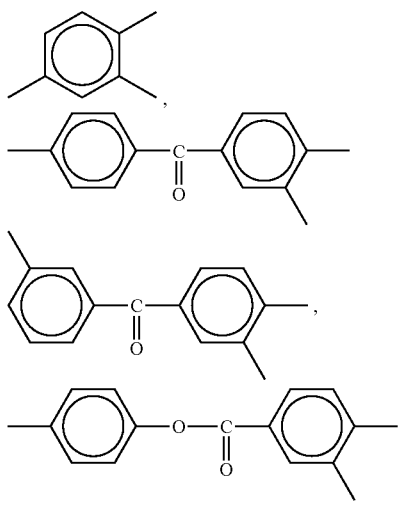

As a method for producing the PAI resin, any known production method such as an acid chloride method (for example, JP-B 46-15513 (the term "JP-B" used herein means "Examined Japanese Patent Publication")) comprising subjecting an aromatic diamine and trimellitic anhydride monochloride to a polymerization reaction, an isocyanate method (for example, JP-B 44-19274) comprising subjecting an aromatic diisocyanate and trimellitic anhydride to a polymerization reaction and a direct polymerization method (for example, JP-B 49-4077) comprising heating an aromatic diamine and trimellitic anhydride to 200 to 250° C. can be used.

As the PAI resin in the present invention, a PAI resin having a weight average molecular weight (Mw) in terms of PEG using GPC of 1,000 to 100,000 can be used. A PAI resin having a weight average molecular weight in terms of PEG of 1,000 to 50,000 is preferably used, and a PAI resin having a weight average molecular weight in terms of PEG of 1,000 to 30,000 is more preferably used.

The weight average molecular weight in terms of PEG can be measured under the following conditions by use of LC-6A and RID-6A detector of Shimadzu Corporation. The weight average molecular weight in terms of PEG can be determined by measuring PEG whose molecular weight is known and preparing a calibration curve.

Column Used: shodex KD-806M
Elute: N,N-dimethyl formamide
Column Temperature: 50° C.
Flow Rate of Elute: 0.5 ml/min Further, a PAI resin showing a content of amino groups in a molecule of 0.00002 to 0.002 mol/g, preferably 0.00005 to 0.001 mol/g, when measured by neutralization titration using hydrochloric acid can also be used in the present invention.

The neutralization titration is conducted by dissolving the PAI resin in dimethyl formamide, dropping 0.1 mol/l hydrochloric acid thereto and determining the point of neutralization by use of a potentiometer.

<Polyarylene Sulfide Resin (B)>

The polyarylene sulfide resin (PAS resin) which is the component (B) of the resin composition of the present invention is an aromatic polymer comprising, as a main constituent, an arylene sulfide recurring unit represented by the following general formula (II):

$$[\text{—Ar—S—}] \tag{II}$$

(wherein —Ar— is an arylene group.)

When [—Ar—S—] is defined as 1 mole (standard mole), the PAS resin used in the present invention is a polymer containing the recurring unit in an amount of generally not smaller than 50 mol %, preferably not smaller than 70 mol %, more preferably not smaller than 90 molt.

Illustrative examples of the arylene group include a p-phenylene group, an m-phenylene group, a substituted phenylene group. (the substituent is preferably an alkyl group having 1 to 6 carbon atoms or a phenyl group), a p,p'-diphenylenesulfonic group, a p,p'-biphenylene group, p,p'-diphenylenecarbonyl group and a naphthylene group. As the PAS resin, a polymer having one type of arylene group as a main component can be preferably used. However, in view of processability and heat resistance, a copolymer containing two or more types of arylene groups can aslo be used.

Of these PAS resins, a PPS resin comprising, as a main constituent, a p-phenylene sulfide recurring unit is particularly preferred since it has excellent processability and is industrially easily obtained. In addition, a polyarylene ketone sulfide, polyarylene ketone ketone sulfide and the like can also be used.

Specific examples of the copolymer include a random or block copolymer having a p-phenylene sulfide recurring unit and an m-phenylene sulfide recurring unit, a random or block copolymer having a phenylene sulfide recurring unit and an arylene ketone sulfide recurring unit, a random or block copolymer having a phenylene sulfide recurring unit and an arylene ketone ketone sulfide recurring unit, and a random or block copolymer having a phenylene sulfide recurring unit and an arylene sulfone sulfide recurring unit. These PAS resins are preferably crystalline polymers.

Further, the PAS resin is preferably a linear polymer in view of tenacity and strength. Such a PAS resin can be obtained by a known method (for example, JP-B 63-33775)

comprising polymerizing an alkali metal sulfide with a dihalogen substituted aromatic compound in a polar solvent.

Illustrative examples of the alkali metal sulfide include lithium sulfide, sodium sulfide, potassium sulfide, rubidium sulfide and cesium sulfide. Sodium sulfide produced by reacting NaSH with NaOH in the reaction system can also be used.

Illustrative examples of the dihalogen substituted aromatic compound include p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl, 3,5-dichlorobenzoic acid, p,p'-dichlorodiphenyl ether, 4,4'-dichlorodiphenyl sulfone, 4,4'-dichlorodiphenyl sulfoxide, and 4,4'-dichlorodiphenyl ketone. These can be used alone or in combination of two or more.

To introduce a certain degree of a branch structure or crosslink structure into the PAS resin, a small amount of a polyhalogen substituted aromatic compound having at least 3 halogen substituents per molecule can be used. Preferred examples of the polyhalogen substituted aromatic compound include trihalogen substituted aromatic compounds such as 1,2,3-trichlorobenzene, 1,2,3-tribromobenzene, 1,2,4-trichlorobenzene, 1,2,4-tribromobenzene, 1,3,5-trichlorobenzene, 1,3,5-tribromobenzene and 1,3-dichloro-5-bromobenzene, and alkyl substituted forms of these compounds. These can be used alone or in combination of two or more. Of these, 1,2,4-trichlorobenzene, 1,3,5-trichlorobenzene and 1,2,3-trichlorobenzene are more preferred from the viewpoints of economy, reactivity and physical properties.

As the polar solvent, an N-alkyl pyrrolidone such as N-methyl-2-pyrrolidone, 1,3-dialkyl-2-imidazolidinone, tetraalkyl urea, and an aprotic organic amide solvent such as hexaalkyl phosphoric acid triamide are preferred since the stability of the reaction system is high and a polymer with a high molecular weight is obtained easily.

The PAS resin generally shows a melt viscosity measured at a temperature of 310° C. and a shear rate of 1,200/sec of 10 to 600 Pa·s, preferably 50 to 550 Pa·s, more preferably 70 to 550 Pa·s. When two or more PAS resins having different melt viscosities are blended and used, the melt viscosity of the blend is preferably within the above range. Further, the PAS resin particularly desirably has a melt viscosity of 100 Pa·s or higher from the viewpoints of mechanical strength and tenacity. When the melt viscosity of the PAS resin is too low, physical properties such as mechanical strength and tenacity may become insufficient. When the melt viscosity of the PAS resin is too high, melt flowability becomes insufficient, and injection moldability and extrusion moldability may become unsatisfactory.

As the PAS resin, a PAS resin washed after completion of polymerization can be used. Further, a PAS resin treated with an aqueous solution containing acid such as hydrochloric acid or acetic acid or a mixed solution comprising water and an organic solvent and a PAS resin treated with a salt solution such as ammonium chloride are preferably used. Particularly, by use of a PAS resin washed to such an extent that it shows a pH of 8 or lower in a mixed solvent adjusted to a ratio of acetone to water of 1:2 (volume ratio), the melt flowability and mechanical physical properties of the resin composition can be further improved.

The PAS resin is desirably a particulate material having an average particle diameter of 100 μm or larger. When the average particle diameter of the PAS resin is too small, a feed rate is limited at the time of melt-extrusion by an extruder, so that the residence time of the resin composition in the extruder becomes long and a problem such as deterioration of the resin composition may occur. Further, the excessively small average particle diameter is not desirable from the viewpoint of production efficiency as well.

<Episulfide Compound (C)>

The episulfide compound which is the component (C) is a compound having at least one episulfide group in a molecule.

As the episulfide compound, a compound represented by the following general formula (III):

wherein $X_1$ each independently represents a hydrogen atom or a general formula $E-R_2-X_2-$ wherein E represents an episulfide group or an epoxy group and at least one episulfide group is contained in a molecule, is suitably used.

The episulfide group is represented by the following formula:

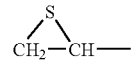

wherein $X_2$ each independently represents a divalent hydrocarbon group having 1 to 6 carbon atoms, an ether bond (—O—), a thioether bond (—S—), a disulfide bond (—S—S—), a carbonyl bond (—CO—), an ester bond (—COO—), an amide bond (—NHCO—) or a single bond.

The divalent hydrocarbon group is preferably an aliphatic hydrocarbon group having 1 to 3 carbon atoms. The aliphatic hydrocarbon group is preferably an alkane-diyl group. Illustrative examples of the alkane-diyl group include an alkylene group having 1 to 3 carbon atoms such as a methylene group and a trimethylene group, and an ethane-diyl group.

$X_3$ each independently represents a hydrogen atom, a monovalent hydrocarbon group having 1 to 24 carbon atoms, a vinyl group, a hydroxy group, an amino group, an ureide group, an isocyanate group, an episulfide group, an epoxy group and a mercapto group.

Illustrative examples of the monovalent hydrocarbon group include an aliphatic group having 1 to 24 carbon atoms and a substituted or unsubstituted aromatic group. The aliphatic group is preferably an alkyl group having 1 to 6 carbon atoms such as a methyl group, an ethyl group, a propyl group, a butyl group and a hexyl group. The aromatic group is preferably a phenyl group or a benzyl group.

$R_1$ each independently represents a tetravalent hydrocarbon group having 1 to 24 carbon atoms. Illustrative examples of the hydrocarbon group include a tetravalent aliphatic group having 1 to 6 carbon atoms, a tetravalent alicyclic group having 6 to 8 carbon atoms and a tetravalent aromatic group having 6 to 15 carbon atoms. An alkane-tetrayl group having 1 to 6 carbon atoms is preferred as the aliphatic group, a cycloalkane-tetrayl group having 6 to 8 carbon atoms is preferred as the alicyclic hydrocarbon group, and an arene-tetrayl group having 6 to 15 carbon atoms is preferred as the aromatic hydrocarbon group.

$R_2$ each independently represents a divalent hydrocarbon group having 1 to 24 carbon atoms. The hydrocarbon group is preferably an aliphatic hydrocarbon group having 1 to 3 carbon atoms. The aliphatic hydrocarbon group is preferably an alkane-diyl group. Illustrative examples of the alkane-diyl group include an alkylene group having 1 to 3 carbon atoms such as a methylene group, an ethylene group and a propylene group, and an ethane-diyl group. n represents an integer of 0 to 20.

The episulfide compound (C) is preferably a compound represented by the following general formula (III-1). The general formula (III-1) is equivalent to the general formula (III) wherein n is 0 and $X_1$ is $E-R_2—X_2—$.

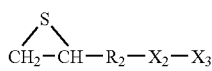
(III-1)

wherein $R_2$ represents a methylene group, an ethylene group or an ethane-1,1-diyl group. $X_2$ represents a single bond, —O— or an alkane-diyl group. Illustrative examples of the alkane-diyl group include a methylene group, an ethylene group and a trimethylene group. $X_3$ represents an alkyl group having 1 to 6 carbon atoms such as a methyl group, an ethyl group, a propyl group and a butyl group, —OH, a phenyl group or a benzyl group.

Further, the episulfide compound (C) is preferably a compound represented by the following general formula (III-2). The general formula (III-2) is equivalent to the general formula (III) wherein n is 1, $X_1$ is $E-CH_2—X_2—$, $X_1$ in the parentheses is H, $X_3$ in the parentheses is H, and $X_2$ in the parentheses is a single bond.

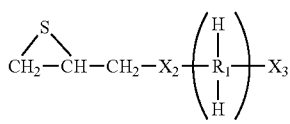
(III-2)

wherein $X_2$ represents a single bond, —O—, —S— or —S—S—.

$X_3$ represents —SH or

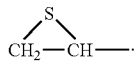

$R_1$ represents an alkane-tetrayl group having 1 to 6 carbon atoms, a cycloalkane-tetrayl group having 6 to 8 carbon atoms or an arene-tetrayl group having 6 to 15 carbon atoms.

Illustrative examples of the alkane-tetrayl group include a methane-tetrayl group, an ethane-tetrayl group, a propane-tetrayl group, a butane-tetrayl group and a pentane-tetrayl group. Illustrative examples of the cycloalkane-tetrayl group include a cyclohexane-tetrayl group. Illustrative examples of the arene-tetrayl group include a benzene-tetrayl group, a xylene-tetrayl group, a diphenyl-tetrayl-group, a diphenyl-methane-tetrayl group and a diphenylpropane-tetrayl group.

Further, the episulfide compound (C) is preferably a compound represented by the following general formula (III-3). The general formula (III-3) is equivalent to the general formula (III) wherein n is 1, $X_1$ is $E-CH_2—X_2—$, $X_3$ is H and $X_2$ in the parentheses is a single bond.

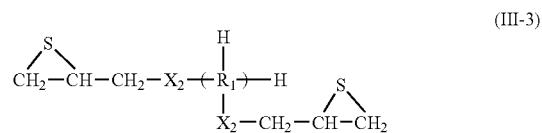
(III-3)

wherein $X_2$ each independently represents —S— or —O—. $R_1$ represents an alkane-tetrayl group having 1 to 5 carbon atoms, a cycloalkane-tetrayl group having 6 to 8 carbon atoms or an arene-tetrayl group having 6 to 15 carbon atoms.

Illustrative examples of the alkane-tetrayl group include a methane-tetrayl group, an ethane-tetrayl group, a propane-tetrayl group, a butane-tetrayl group and a pentane-tetrayl group. Illustrative examples of the cycloalkane-tetrayl group include a cyclohexane-tetrayl group. Illustrative examples of the arene-tetrayl group include a benzene-tetrayl group, a xylene-tetrayl group, a diphenyl-tetrayl group, a diphenyl-methane-tetrayl group and a diphenylpropane-tetrayl group.

Episulfide compounds which are suitably used in the present invention will be presented below. These may be used alone or in combination of two or more.

(a-1) Case where the Episulfide Compound is a Compound Represented by the General Formula (III-1).

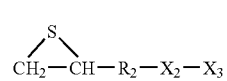
(III-1)

$R_2$: methylene group, ethane-1,1-diyl group $X_2$: single bond $X_3$: alkyl group having 1 to 6 carbon atoms

| Name of Compound | Structural Formula |
|---|---|
| 1-propyl-episulfide(1,2-epithiopentane) | ![](CH_2—CH—CH_2CH_2CH_3 with S epoxide) |
| 2-propyl-episulfide(1,2-epithio-3-methyl-butane) | _2 with S epoxide) |
| 1-butyl-episulfide(1,2-epithiohexane) | ![](CH_2—CH—CH_2CH_2CH_2CH_3 with S epoxide) |
| 2-butyl-episulfide(1,2-epithio-3-methyl-pentane) | CH_2CH_3 with S epoxide) |

(a-2) Case Where the Episulfide Compound is a Compound Represented by the General Formula (III-1).

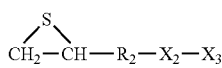 (III-1)

$R_2$: methylene group
$X_2$: —O—
$X_3$: alkyl group having 1 to 6 carbon atoms, phenyl group, benzyl group

| Name of Compound | Structural Formula |
|---|---|
| Methyl thioglycidyl ether(2,3-epithiopropyl methyl ether) | CH₂—CH–CH₂—O—CH₃ (with S epoxide) |
| Propyl thioglycidyl ether(2,3-epithiopropyl propyl ether) | CH₂—CH–CH₂—O—CH₂CH₂CH₃ (with S epoxide) |
| Butyl thioglycidyl ether | CH₂—CH–CH₂—O—CH₂CH₂CH₂CH₃ (with S epoxide) |
| Phenyl thioglycidyl ether | CH₂—CH–CH₂—O—C₆H₅ (with S epoxide) |
| Benzyl thioglycidyl ether | CH₂—CH–CH₂—O—CH₂—C₆H₅ (with S epoxide) |

(a-3) Case Where the Episulfide Compound is a Compound Represented by the General Formula (III-1).

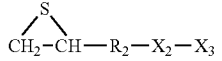 (III-1)

$R_2$: methylene group, ethane-1,1-diyl group
$X_2$: single bond, alkane-diyl group
$X_3$: —OH

| Name of Compound | Structural Formula |
|---|---|
| 2,3-episulfide-1-propanol (2,3-epithiopropanol) | CH₂—CH—CH₂—OH (with S epoxide) |
| 3,4-episulfide-1-butanol (3,4-epithio-1-butanol) | CH₂—CH–CH₂—CH₂OH (with S epoxide) |
| 3,4-episulfide-2-butanol (3,4-epithio-2-butanol) | CH₂—CH–CH(OH)—CH₃ (with S epoxide) | a-4 Case Where the Episulfide Compound is a Compound Represented by the General Formula (III-1).

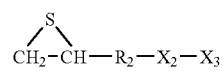 (III-1)

$R_2$: methylene group
$X_2$: single bond, alkane-diyl group
$X_3$: —OH

| Name of Compound | Structural Formula |
|---|---|
| 4,5-episulfide-1-pentanol (4,5-epithio-1-pentanol) | CH₂—CH–CH₂—CH₂CH₂OH (with S epoxide) |
| 4,5-episulfide-2-pentanol (4,5-epithio-2-pentanol) | CH₂—CH–CH₂—CH(OH)—CH₃ (with S epoxide) |
| 5,6-episulfide-1-hexanol (5,6-epithio-1-hexanol) | CH₂—CH–CH₂—CH₂CH₂CH₂OH (with S epoxide) |
| 5,6-episulfide-2-hexanol (5,6-epithio-2-hexanol) | CH₂—CH–CH₂—CH₂—CH(OH)—CH₃ (with S epoxide) |

(b) Case Where the Episulfide Compound is a Compound Represented by the General Formula (III-2).

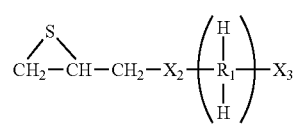 (III-2)

$X_2$: —O—, —S—, —S—S—, single bond
$X_3$: -E, —SH
$R_1$: methane-tetrayl, benzene-tetrayl

| Name of Compound | Structural Formula |
|---|---|
| Bisthioglycidyl sulfide(bis(2,3-epithio propyl)sulfide) | CH₂—CH–CH₂—S—CH₂—CH–CH₂ (with S epoxides) |
| Bisthioglycidyl ether(bis(2,3-epithio propyl)ether) | CH₂—CH–CH₂—O—CH₂—CH–CH₂ (with S epoxides) |
| Bisthioglycidyl disulfide(bis(2,3-epithio propyl)disulfide) | CH₂—CH–CH₂—S—S—CH₂—CH–CH₂ (with S epoxides) |
| 2-thioglycidyl-1-benzene thiol(2,3-epithiopropyl benzenethiol) | CH₂—CH–CH₂—C₆H₄—SH (with S epoxide) |

(c-1) Case Where the Episulfide Compound is a Compound Represented by the General Formula (III-3).

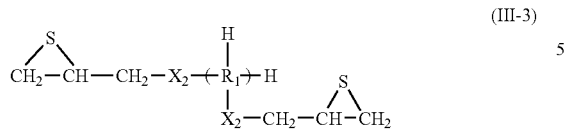
(III-3)

X$_2$: —O—, —S—
R$_1$: alkane-tetrayl

| Name of Compound | Structural Formula |
|---|---|
| Bis(2,3-epithiopropylthio)methane | CH$_2$—CH—CH$_2$—S—CH$_2$—S—CH$_2$—CH—CH$_2$ (with S epithio groups on terminal CH$_2$—CH) |
| 1,2-bis(2,3-epithiopropylthio)ethane | CH$_2$—CH—CH$_2$—S—C$_2$H$_4$—S—CH$_2$—CH—CH$_2$ |
| 1,2-bis(2,3-epithiopropylthio)propane | CH$_2$—CH—CH$_2$—S—CH$_2$CH(CH$_3$)—S—CH$_2$—CH—CH$_2$ |
| 1,3-bis(2,3-epithiopropylthio)propane | CH$_2$—CH—CH$_2$—S—CH$_2$CH$_2$CH$_2$—S—CH$_2$—CH—CH$_2$ |
| 1,3-bis(2,3-epithiopropylthio)-2-methylpropane | CH$_2$—CH—CH$_2$—S—CH$_2$CH(CH$_3$)—CH$_2$—S—CH$_2$—CH—CH$_2$ |
| 1,4-bis(2,3-epithiopropylthio)butane | CH$_2$—CH—CH$_2$—S—CH$_2$CH$_2$CH$_2$CH$_2$—S—CH$_2$—CH—CH$_2$ |
| 1,4-bis(2,3-epithiopropylthio)-2-methylbutane | CH$_2$—CH—CH$_2$—S—CH$_2$CH$_2$CH(CH$_3$)CH$_2$—S—CH$_2$—CH—CH$_2$ |
| 1,3-bis(2,3-epithiopropylthio)butane | CH$_2$—CH—CH$_2$—S—CH$_2$CH$_2$CH(CH$_3$)—S—CH$_2$—CH—CH$_2$ |
| 1,5-bis(2,3-epithiopropylthio)pentane | CH$_2$—CH—CH$_2$—S—CH$_2$CH$_2$CH$_2$CH$_2$CH$_2$—S—CH$_2$—CH—CH$_2$ |

(c-2) Case Where the Episulfide Compound is a Compound Represented by the General Formula (III-3).

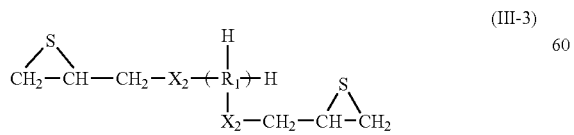
(III-3)

X$_2$: —O—, —S—
R$_1$: cycloalkane-tetrayl group having 6 to 8 carbon atoms

| Name of Compound | Structural Formula |
| --- | --- |
| 1,3-bis(2,3-epithio-propylthio)cyclohexane | |
| 1,4-bis(2,3-epithio-propylthio)cyclohexane | |
| 1,3-bis(2,3-epithio-propylthiomethyl)cyclohexane | |
| 1,4-bis(2,3-epithio-propylthiomethyl)cyclohexane | |
| 2,5-bis(2,3-epithio-propylthiomethyl)-1,4-dithian | |
| 2,5-bis[{2-(2,3-epithio propylthio)ethyl}thio methyl]-1,4-dithian | |

(c-3) Case Where the Episulfide Compound is a Compound Represented by the General Formula (III-3).

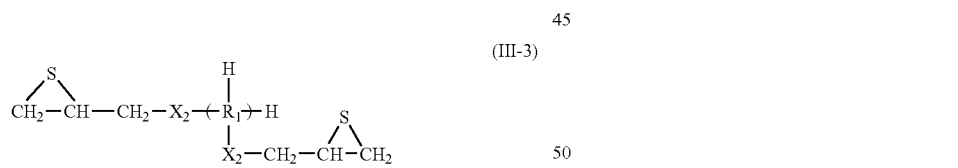

(III-3)

$X_2$: —O—, —S—

$R_1$: arene-tetrayl group

| Name of Compound | Structural Formula |
| --- | --- |
| 1,3-bis(2,3-epithiopropyl thio)benzene | |

-continued

| Name of Compound | Structural Formula |
|---|---|
| 1,4-bis(2,3-epithiopropyl thio)benzene | $CH_2\underset{S}{\overset{}{\diagdown}}CH-CH_2-S-\phenyl-S-CH_2-CH\underset{S}{\overset{}{\diagdown}}CH_2$ |
| 1,3-bis(2,3-epithiopropyl thiomethyl)benzene | $CH_2\underset{S}{\overset{}{\diagdown}}CH-CH_2-S-CH_2-\phenyl-CH_2-S-CH_2-CH\underset{S}{\overset{}{\diagdown}}CH_2$ |
| 1,4-bis(2,3-epithiopropyl thiomethyl)benzene | $CH_2\underset{S}{\overset{}{\diagdown}}CH-CH_2-S-CH_2-\phenyl-CH_2-S-CH_2-CH\underset{S}{\overset{}{\diagdown}}CH_2$ |
| bis{4-(2,3-epithiopropyl thio)phenyl}methane | $CH_2\underset{S}{\overset{}{\diagdown}}CH-CH_2-S-\phenyl-CH_2-\phenyl-S-CH_2-CH\underset{S}{\overset{}{\diagdown}}CH_2$ |
| 2,2-bis{4-(2,3-epithio propylthio)phenyl}propane | $CH_2\underset{S}{\overset{}{\diagdown}}CH-CH_2-S-\phenyl-C(CH_3)_2-\phenyl-S-CH_2-CH\underset{S}{\overset{}{\diagdown}}CH_2$ |
| 2,2-bis{4-(2,3-epithio propyloxy)phenyl}propane | $CH_2\underset{S}{\overset{}{\diagdown}}CH-CH_2-O-\phenyl-C(CH_3)_2-\phenyl-O-CH_2-CH\underset{S}{\overset{}{\diagdown}}CH_2$ |
| 4,4'-bis(2,3-epithio propylthio)biphenyl | $CH_2\underset{S}{\overset{}{\diagdown}}CH-CH_2-S-\phenyl-\phenyl-S-CH_2-CH\underset{S}{\overset{}{\diagdown}}CH_2$ |

(d) Others

| Name of Compound | Structural Formula |
|---|---|
| 1,5-bis(2,3-epithiopropyl thio)-3-thiapentane | $CH_2\underset{S}{\overset{}{\diagdown}}CH-CH_2-S-CH_2CH_2-S-CH_2CH_2-S-CH_2-CH\underset{S}{\overset{}{\diagdown}}CH_2$ |
| 2,2-bis(2,3-epithiopropyl thio)-1,3-bis(2,3-epithiopropylthiomethyl) propane | $CH_2\underset{S}{\overset{}{\diagdown}}CH-CH_2-S-CH_2-C(CH_2-S-CH_2-CH\underset{S}{\overset{}{\diagdown}}CH_2)_2-CH_2-S-CH_2-CH\underset{S}{\overset{}{\diagdown}}CH_2$ |
| 2,2-bis(2,3-epithiopropyl thiomethyl)-1-(2,3-epithiopropylthio)butane | $CH_2\underset{S}{\overset{}{\diagdown}}CH-CH_2-S-CH_2-C(CH_2-S-CH_2-CH\underset{S}{\overset{}{\diagdown}}CH_2)(CH_2-S-CH_2-CH\underset{S}{\overset{}{\diagdown}}CH_2)-CH_2CH_3$ |

-continued

| Name of Compound | Structural Formula |
|---|---|
| 1,5-bis(2,3-epithiopropyl thio)-2-(2,3-epithio propylthiomethyl)-3-thiapentane | (structure) |
| 1,5-bis(2,3-epithiopropyl thio)-2,4-bis(2,3-epithio propylthiomethyl)-3-thiapentane | (structure) |
| 1,1,2,2-tetrakis[{2-(2,3-epithiopropylthio)ethyl} thiomethyl]ethane | (structure) |

Further, in the present invention, compounds resulting from substituting some of the episulfide groups of the above compounds with epoxy groups can be used. More preferably, methyl thioglycidyl ether, propyl thioglycidyl ether, butyl thioglycidyl ether, phenyl thioglycidyl ether, benzyl thioglycidyl ether, 2,3-episulfide-1-propanol, 2,3-episulfide-1-butanol, 3,4-episulfide-1-butanol, 3,4-episulfide-2-butanol, bisthioglycidyl sulfide and bisthioglycidyl ether can be used.

The content of the PAI resin in the present invention is 5 to 60 parts by weight, preferably 20 to 50 parts by weight, more preferably 30 to 50 parts by weight, based on 100 parts by weight of the total of the PAI resin and the PAS resin. The content of the PAS resin in the present invention is 95 to 40 parts by weight, preferably 80 to 50 parts by weight, more preferably 70 to 50 parts by weight, based on 100 parts by weight of the total of the PAI resin and the PAS resin. The content of the episulfide compound in the present invention is generally 0.01 to 10 parts by weight, preferably 0.01 to 8 parts by weight, more preferably 0.03 to 6 parts by weight, based on 100 parts by weight of the total of the PAI resin and the PAS resin.

The resin composition of the present invention is produced by melt-kneading the PAI resin, the PAS resin and the episulfide compound. The melt kneading temperature is 250 to 400° C., preferably 280 to 360° C. The materials can be kneaded by an extruder, a kneader, a Banbury mixer, a mixing roll or the like. A preferred kneading method is a method using a twin-screw extruder.

(Other Components)

The resin composition of the present invention may contain other components such as additives, e.g., a filler, a pigment, a lubricant, a plasticizer, a stabilizer, an ultraviolet absorber, a flame retardant and a flame retardant aid, and other resins as required.

Illustrative examples of the filler include mineral fillers such as glass beads, wollastonite, mica, talc, kaolin, silicon dioxide, clay, asbestos, calcium carbonate, magnesium hydroxide, silica, diatomaceous earth, graphite, carborundum and molybdenum disulfide; glass fibers, milled fibers, potassium titanate fibers, boron fibers, and silicon carbide fibers. The filler can be used in an amount of 1 to 70 wt % of the resin composition. Preferable fillers are glass fibers, milled fibers, carbon fibers and potassium titanate fibers. Those treated with an urethane-based silane coupling agent, an amino-based silane coupling agent or other silane coupling agent can also be suitably used.

Illustrative examples of the pigment include titanium oxide, zinc sulfide and zinc oxide.

Illustrative examples of the lubricant include mineral oil, silicone oil, ethylene wax, polypropylene wax, metal salts such as sodium stearate and sodium montanate, and amide montanate.

Further, illustrative examples of the plasticizer include generally used silane-based compounds, and phthalic acid compounds such as dimethyl phthalate and dioctyl phthalate. In addition, generally used ultraviolet absorbers, coloring agents and the like can be used.

Illustrative examples of the flame retardant include phosphoric esters such as triphenyl phosphate, bromine compounds such as decabromobiphenyl, pentabromotoluene and a brominated epoxy resin, and nitrogen-containing phosphorus compounds such as melamine derivatives. A flame retardant aid may be used. Illustrative examples of the flame retardant aid include antimony compounds, boron compounds, and zinc compounds.

Illustrative examples of other resins include epoxy resins, phenoxy resins, polyesters such as polyethylene terephthalate and polybutylene terephthalate, fluorine resins such as ethylene tetrafluoride, and aromatic resins such as polyphenylene ether, polysulfone, polycarbonate, polyether ketone, polyether imide and polyether ether ketone.

(Molding Method)

As described above, the present invention includes the resin composition comprising the PAI resin (A), the PAS resin (B) and the episulfide compound (C). Further, the present invention includes a molded article comprising the resin composition. Molding is carried out by a general injection molding method. The cylinder temperature ranges from 290 to 360° C., and the mold temperature desirably ranges from 120 to 160° C. so as to attain satisfactory heat resistance. Further, a heat treatment is desirably carried out after molding so as to improve heat resistance and to remove residual stress. In particular, when molding is carried out at a mold temperature of lower than 120° C., the heat treatment is preferably carried out. Means for carrying out the heat treatment is not particularly limited, and a general hot-air oven or microwave oven or oven range is used. The heat treatment can be carried out at 150 to 300° C., preferably 180 to 280° C., most preferably 200 to 260° C., for 30 seconds to 48 hours, preferably 1 to 36 hours, at normal pressure or under reduced pressure.

(Method for Improving Melt Flowability of Resin Composition)

The present invention includes a method for improving the melt flowability of a resin composition comprising an aromatic polyamide imide resin and a polyarylene sulfide resin, the method comprising adding 0.01 to 10 parts by weight of episulfide compound (C) to a resin composition comprising 5 to 60 parts by weight of aromatic polyamide imide resin (A) having a weight average molecular weight (Mw) of 1,000 to 100,000 and having an amino group in an amount of 0.00002 to 0.002 mol/g in a molecule and 95 to 40 parts by weight of polyarylene sulfide resin (B). The components (A), (B) and (C) and their amounts are the same as those described with respect to the resin composition.

Further, the present invention includes use of an episulfide compound as a melt flowability imparting agent for a resin composition comprising 5 to 60 parts by weight of aromatic polyamide imide resin (A) having a weight average molecular weight (Mw) of 1,000 to 100,000 and having an amino group in an amount of 0.00002 to 0.002 mol/g in a molecule and 95 to 40 parts by weight of polyarylene sulfide resin (B).

EXAMPLES

The present invention will be further described with reference to Examples. The present invention shall not be limited by these Examples in any way.

Synthesis Example 1

Synthesis of PAI Resin (1)

3 liters of N-methylpyrrolidone having a water content of 15 ppm was charged into a 5-liter reactor equipped with a stirrer, a thermometer and a reflux condenser having a drying tube. The drying tube had calcium chloride filled at its tip. To the reactor, 555 g (50 mol %) of trimellitic anhydride and then 503 g (50 mol %) of 2,4-tolylene diisocyanate were added. The content of water in the system at the time of addition of trimellitic anhydride was 30 ppm. Initially, the temperature of the contents was elevated from room temperature to 120° C. in 30 minutes, and the contents were kept at the temperature for 8 hours. After completion of polymerization, the polymerization solution was added dropwise to methanol whose amount was twice as much as that of N-methylpyrrolidone under vigorous agitation so as to precipitate a polymer. The precipitated polymer was suctioned, separated by filtration, washed well with methanol, and then vacuum-dried at 200° C. so as to obtain a polyamide imide resin (PAI resin (1)).

As a result of measuring its weight average molecular weight in terms of PEG (polyethylene glycol) by use of GPC, Mw was found to be 9,000. The measurement conditions are as follows.

GPC Instruments: LC-6A and RID-6A detector of Shimadzu Corporation

Column Used: shodex KD-806M
Elute: N,N-dimethyl formamide
Column Temperature: 50° C.
Flow Rate of Elute: 0.5 ml/min
Calibration Curve: prepared by measuring PEG whose molecular weight is known.

Further, as a result of dissolving the polyamide imide resin in dimethyl formamide and carrying out neutralization titration by use of hydrochloric acid, the content of amino groups in a molecule was found to be 0.0001 mol/g.

Synthesis Example 2

Synthesis of PAI Resin (2)

To a 5-liter reactor equipped with a stirrer, 1.5 liters of acetone and 1.5 liters of water were added. Then, 202 g of triethylamine, 421 g (50 mol %) of trimellitic anhydride monochrolide, and 244 g (50 mol %) of m-tolylene diamine were added sequentially. The resulting mixture was stirred at room temperature for 2 hours, and the precipitated polymer was suctioned, separated by filtration, washed well with methanol and vacuum-dried at 200° C. for 24 hours so as to obtain a polyamide imide resin (PAI resin(2)).

As a result of measuring its weight average molecular weight in terms of PEG by use of GPC as in Synthesis Example 1, Mw was found to be 7,000 (solvent: dimethyl formamide). Further, as a result of dissolving the polyamide imide resin in dimethyl formamide and carrying out neutralization titration by use of hydrochloric acid, the content of amino groups in a molecule was found to be 0.00007 mol/g.

Synthesis Example 3

Synthesis of PAI Resin (3)

After trimellitic anhydride and 2,4-tolylene diisocyanate were added in Synthesis Example 1, the temperature of the contents was raised from room temperature to 200° C. in 50 minutes, and the contents were kept at the temperature for 6 hours. Then, after a polymer was precipitated, a polyamide imide resin (PAI resin (3)) was obtained in the same manner as in Synthesis Example 1.

As a result of measuring its weight average molecular weight in terms of PEG by use of GPC as in Synthesis Example 1, Mw was found to be 120,000 (solvent: dimethyl formamide). Further, as a result of dissolving the polyamide imide resin in dimethyl formamide and carrying out neutralization titration by use of hydrochloric acid, the content of amino groups in a molecule was found to be 0.00008 mol/g.

Synthesis Example 4

Synthesis of PAI Resin (4)

After trimellitic anhydride and 2,4-tolylene diisocyanate were added in Synthesis Example 1, the temperature of the contents was raised from room temperature to 90° C. in 20 minutes, and the contents were kept at the temperature for 50 minutes. Thereafter, the temperature of the contents was raised to. 115° C., and the contents were kept at the temperature for 8 hours. Then, a polyamide imide resin (PAI resin (4)) was obtained in the same manner as in Synthesis Example 1.

As a result of measuring its weight average molecular weight in terms of PEG by use of GPC as in Synthesis Example 1, Mw was found to be 8,000 (solvent: dimethyl formamide). Further, as a result of dissolving the polyamide imide resin in dimethyl formamide and carrying out neutralization titration by use of hydrochloric acid, the content of amino groups in a molecule was found to be 0.000001 mol/g.

Example 1

49.5 wt % of the PAI resin (1) which was produced in Synthesis Example 1, 49.5 wt % of PAS resin (DIC-PPS-LR03 of Dainippon Ink And Chemicals, Incorporated, recurring unit: p-phenylene, melt viscosity measured at a temperature of 310° C. and a shear rate of 1,200/sec: 300 Pa·s) and 1 wt % of phenyl thioglycidyl ether were blended and then melt-kneaded at 320° C. and pelletized by use of a twin-screw extruder so as to produce a resin composition.

(Measurement of Melt Flowability)

Melt flowability was measured from the pellet (CAPIROGRAPH 1B of Toyo Seiki Seisaku-Sho, Ltd., 350° C., shear rate=1,200 sec$^{-1}$).

(Measurements of Flexural Strength, Flexural Modulus, Flexural Distortion and Heat Deflection Temperature)

This pellet was injection molded into a ⅛-inch-thick flexural test piece. By use of this test piece, flexural strength, a flexural modulus, flexural distortion and a heat deflection temperature were measured.

The flexural strength, flexural modulus and flexural distortion were measured by use of the autograph AG5000B of Shimadzu Corporation (measurement conditions: 23° C., ASTM D790).

The heat deflection temperature (DTUL) of this test piece was measured by use of HD-500-PC of YASUDA SEIKI SEISAKUSHO, LTD. under a load of 18.6 kg/cm$^2$ in a nitrogen atmosphere (ASTM D648).

The results of the measurements are shown in Table 1.

Example 2

A resin composition was produced and evaluated in the same manner as in Example 1 except that bisthioglycidyl sulfide was used as an episulfide compound. The results are shown in Table 1.

Example 3

46 wt % of the PAI resin (1) produced in Synthesis Example 1, 46 wt % of PAS resin (DIC-PPS-LR03 of Dainippon Ink And Chemicals, Incorporated) and 8 wt % of phenyl thioglycidyl ether were blended, and a resin composition was produced and evaluated in the same manner as in Example 1. The results are shown in Table 1.

Example 4

49.5 wt % of the PAI resin (2) produced in Synthesis Example 2, 49.5 wt % of PAS resin (DIC-PPS-LR03 of Dainippon Ink And Chemicals, Incorporated) and 1 wt % of phenyl thioglycidyl ether were blended, and a resin composition was produced and evaluated in the same manner as in Example 1. The results are shown in Table 1.

Example 5

A resin composition was produced and evaluated in the same manner as in Example 1 except that 2,3-episulfide-1-propanol was used as an episulfide compound. The results are shown in Table 1.

Example 6

A resin composition was produced and evaluated in the same manner as in Example 1 except that 2,2-bis{4-(2,3-epithiopropyloxy)phenyl}propane was used as an episulfide compound. The results are shown in Table 1.

Comparative Example 1

A resin composition was produced and evaluated in the same manner as in Example 1 except that 50 wt % of the PAI resin (1) produced in Synthesis Example 1 and 50 wt % of PAS resin (DIC-PPS-LR03 of Dainippon Ink And Chemicals, Incorporated) were blended. The results are shown in Table 1.

Comparative Example 2

40 wt % of the PAI resin (1) produced in Synthesis Example 1, 40 wt % of PAS resin (DIC-PPS-LR03 of Dainippon Ink And Chemicals, Incorporated) and 20 wt % of phenyl thioglycidyl ether were blended, and a resin composition was produced and evaluated in the same manner as in Example 1. The results are shown in Table 1.

Comparative Example 3

40 wt % of the PAI resin (1) produced in Synthesis Example 1, 40 wt % of PAS resin (DIC-PPS-LR03 of Dainippon Ink And Chemicals, Incorporated) and 20 wt % of bisthioglycidyl sulfide were blended, and a resin composition was produced and evaluated in the same manner as in Example 1. The results are shown in Table 1.

Comparative Example 4

A resin composition was produced in the same manner as in Example 1 except that the PAI resin (3) produced in Synthesis Example 3 was used, and physical properties were measured. The results are shown in Table 1.

Comparative Example 5

A resin composition was produced in the same manner as in Example 1 except that the PAI resin (4) produced in Synthesis Example 4 was used, and physical properties were measured. The results are shown in Table 1.

Symbols in Table 1 are as follows.
PAI Resin (1): PAI resin of Synthesis Example 1
PAI Resin (2): PAI resin of Synthesis Example 2
PAI Resin (3): PAI resin of Synthesis Example 3
PAI Resin (4): PAI resin of Synthesis Example 4
PAS Resin: polyarylene sulfide resin, DIC-PPS-LR03 of Dainippon Ink And Chemicals, Incorporated
EPS Compound (1): phenyl thioglycidyl ether
EPS Compound (2): bisthioglycidyl sulfide
EPS Compound (3): 2,3-episulfide-1-propanol
EPS Compound (4): 2,2-bis{4-(2,3-epithiopropyloxy)phenyl}propane
DTUL: heat deformation temperature

TABLE 1

|  | Ex. 1 | Ex. 2 | Ex. 3 | Ex. 4 | Ex. 5 | Ex. 6 | C. Ex. 1 | C. Ex. 2 | C. Ex. 3 | C. Ex. 4 | C. Ex. 5 |
|---|---|---|---|---|---|---|---|---|---|---|---|
| PAI Resin (1) (Parts by Weight) | 49.5 | 49.5 | 46 |  | 49.5 | 49.5 | 50 | 40 | 40 |  |  |
| PAI Resin (2) (Parts by Weight) |  |  |  | 49.5 |  |  |  |  |  |  |  |
| PAI Resin (3) (Parts by Weight) |  |  |  |  |  |  |  |  |  | 49.5 |  |
| PAI Resin (4) (Parts by Weight) |  |  |  |  |  |  |  |  |  |  | 49.5 |
| PAS Resin (Parts by Weight) | 49.5 | 49.5 | 46 | 49.5 | 49.5 | 49.5 | 50 | 40 | 40 | 49.5 | 49.5 |
| EPS Compound (1) (Parts by Weight) | 1.0 |  | 8 | 1.0 |  |  |  | 20 |  | 1.0 | 1.0 |
| EPS Compound (2) (Parts by Weight) |  | 1.0 |  |  |  |  |  |  | 20 |  |  |
| EPS Compound (3) (Parts by Weight) |  |  |  |  | 1.0 |  |  |  |  |  |  |
| EPS Compound (4) (Parts by Weight) |  |  |  |  |  | 1.0 |  |  |  |  |  |
| Flexural Strength (MPa) | 130 | 130 | 130 | 130 | 130 | 135 | 90 | 80 | 70 | 60 | 60 |
| Flexural Modulus (GPa) | 5 | 5 | 5 | 5 | 5 | 4 | 4 | 4 | 3 | 3 | 3 |
| Flexural Distortion (%) | 3.0 | 3.3 | 3.1 | 3.0 | 3.1 | 3.4 | 1.2 | 1.2 | 1.0 | 0.9 | 0.9 |
| DTUL (° C.) | 240 | 240 | 230 | 240 | 243 | 237 | 200 | 200 | 180 | 200 | 200 |
| Melt Flowability (poise) | 1,300 | 1,500 | 1,000 | 1,200 | 1,200 | 1,200 | 5,000 | 4,000 | 8,000 | 9,000 | 8,000 |
| Molecular Weight of PAI Resin | 9,000 | 9,000 | 9,000 | 7,000 | 9,000 | 9,000 | 9,000 | 9,000 | 9,000 | 120,000 | 8,000 |
| $NH_2$ in PAI Resin | 0.0001 | 0.0001 | 0.0001 | 0.00007 | 0.0001 | 0.0001 | 0.0001 | 0.0001 | 0.0001 | 0.00008 | 0.000001 |

Ex.: Example,
C. Ex.: Comparative Example

According to the present invention, a resin composition showing excellent compatibility and excellent integration of materials in a molten state and having excellent flowability when molten, strength, tenacity and heat resistance can be provided by mixing a specific aromatic polyamide imide resin (A), polyarylene sulfide resin (B) and episulfide compound (C) in specific proportions.

POSSIBILITY OF INDUSTRIAL UTILIZATION

The resin composition of the present invention has excellent melt flowability, tenacity and mechanical strength. Thus, its application to fields of precision molding and thin article molding is expected.

What is claimed is:

1. A resin composition comprising:
   (1) 5 to 60 parts by weight of aromatic polyamide imide resin (A) having a weight average molecular weight (Mw) of 1,000 to 100,000 and having an amino group in an amount of 0.00002 to 0.002 mol/g in a molecule,
   (2) 95 to 40 parts by weight of polyarylene sulfide resin (B), and
   (3) 0.01 to 10 parts by weight of episulfide compound (C) based on 100 parts by weight of the total of (A) and (B).

2. The resin composition of claim 1, wherein the weight average molecular weight (Mw) of the aromatic polyamide imide resin (A) is 1,000 to 50,000.

3. The resin composition of claim 1, wherein the content of the amino group in the aromatic polyamide imide resin (A) is 0.00005 to 0.001 mol/g.

4. The resin composition of claim 1, wherein the polyarylene sulfide resin (B) shows a melt viscosity measured at a temperature of 310° C. and a shear rate of 1,200/sec of 10 to 600 Pa·s.

5. The resin composition of claim 1, wherein the episulfide compound (C) is a compound represented by the following general formula (III):

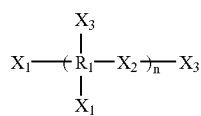

(III)

(wherein $X_1$ each independently represents a hydrogen atom or a general formula $E-R_2-X_2-$ wherein E represents an episulfide group or an epoxy group and at least one episulfide group is contained in a molecule; $X_2$ each independently represents a divalent hydrocarbon group having 1 to 6 carbon atoms, an ether bond, a thioether bond, a disulfide bond, a carbonyl bond, an ester bond, an amide bond or a single bond; $X_3$ each independently represents a hydrogen atom, a monovalent hydrocarbon group having 1 to 24 carbon atoms, a vinyl group, a hydroxyl group, an amino group, an ureide group, an isocyanate group, an episulfide group, an epoxy group or a mercapto group; $R_1$ each independently represents a tetravalent hydrocarbon group having 1 to 24 carbon atoms; $R_2$ each independently represents a divalent hydrocarbon group having 1 to 24 carbon atoms; and n is an integer of 0 to 20.)

6. The resin composition of claim 1, wherein the episulfide compound (C) is at least one compound selected from the group consisting of the following general formulae (III-1), (III-2) and (III-3):

(III-1)

(wherein $R_2$ represents a methylene group, an ethylene group or an ethane-1,1-diyl group; $X_2$ represents a single bond, —O—, a methylene group, an ethylene group or a trimethylene group; and $X_3$ represents an alkyl group having 1 to 6 carbon atoms, —OH, a phenyl group or a benzyl group)

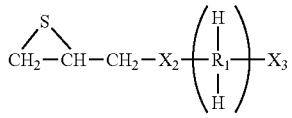

(III-2)

(wherein $X_2$ represents a single-bond, —O—, —S— or —S—S—; $X_3$ represents —SH or

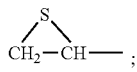

;

and $R_1$ represents a methane-tetrayl group or a benzene-tetrayl group)

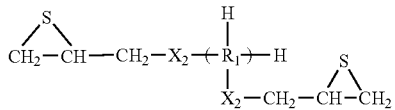

(III-3)

(wherein $X_2$ each independently represents —S— or —O—; $R_1$ represents an alkane-tetrayl group having 1 to 5 carbon atoms, a cycloalkane-tetrayl group having 6 to 8 carbon atoms or an arene-tetrayl group having 6 to 15 carbon atoms).

7. The resin composition of claim 1, wherein the episulfide compound (C) is a compound represented by the following general formula (III-1):

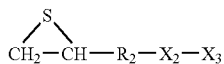

(III-1)

(wherein $R_2$ represents a methylene group, an ethylene group or an ethane-1,1-diyl group; $X_2$ represents a single bond, —O—, a methylene group, an ethylene group or a trimethylene group; and $X_3$ represents an alkyl group having 1 to 6 carbon atoms, —OH, a phenyl group or a benzyl group).

8. The resin composition of claim 1, wherein the episulfide compound (C) is a compound represented by the following general formula (III-2):

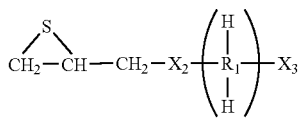

(III-2)

(wherein $X_2$ represents a single bond, —O—, —S— or —S—S—; $X_3$ represents —SH or

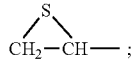

;

and $R_1$ represents a methane-tetrayl group or a benzene-tetrayl group).

9. The resin composition of claim 1, wherein the episulfide compound (C) is a compound represented by the following general formula (III-3):

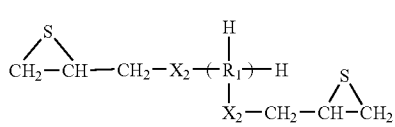

(III-3)

(wherein $X_2$ represents —S— or —O—; $R_1$ represents an alkane-tetrayl group having 1 to 5 carbon atoms, a cycloalkane-tetrayl group having 6 to 8 carbon atoms or an arene-tetrayl group having 6 to 15 carbon atoms).

10. A molded article comprising the resin composition of claim 1.

11. A method for improving the melt flowability of a resin composition comprising an aromatic polyamide imide resin and a polyarylene sulfide resin, comprising adding 0.01 to 10 parts by weight of episulfide compound (C) to a resin composition comprising 5 to 60 parts by weight of aromatic polyamide imide resin (A) having a weight average molecular weight (Mw) of 1,000 to 100,000 and having an amino group in an amount of 0.00002 to 0.002 mol/g in a molecule and 95 to 40 parts by weight of polyarylene sulfide resin (B).

12. The method of claim 11, wherein the episulfide compound (C) is a compound represented by the following general formula (III):

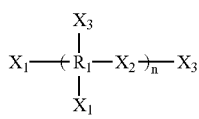

(III)

(wherein $X_1$ each independently represents a hydrogen atom or a general formula E-$R_2$—$X_2$— wherein E represents an episulfide group or an epoxy group and at least one episulfide group is contained in a molecule; $X_2$ each independently represents a divalent hydrocarbon group having 1 to 6 carbon atoms, an ether bond, a thioether bond, a disulfide bond, a carbonyl bond, an ester bond, an amide bond or a single bond; $X_3$ each independently represents a hydrogen atom, a monovalent hydrocarbon group having 1 to 24 carbon atoms, a vinyl group, a hydroxyl group, an amino group, an ureide group, an isocyanate group, an episulfide group, an epoxy group or a mercapto group; $R_1$ each independently represents a tetravalent hydrocarbon group having 1 to 24 carbon atoms; $R_2$ each independently represents a divalent hydrocarbon group having 1 to 24 carbon atoms; and n is an integer of 0 to 20).

* * * * *